(12) United States Patent
Bohn (10) Patent No.: US 6,288,995 B1
(45) Date of Patent: Sep. 11, 2001

(54) NON-MECHANICAL RECORDING AND RETRIEVAL APPARATUS

(76) Inventor: Jerry W. Bohn, 26283 W. State Hwy. 22, Barrington, IL (US) 60010

( * ) Notice: Subject to any disclaimer, the term of this patent is extended or adjusted under 35 U.S.C. 154(b) by 0 days.

(21) Appl. No.: 09/165,025

(22) Filed: Sep. 30, 1998

Related U.S. Application Data (60) Provisional application No. 60/060,563, filed on Sep. 30, 1997.

(51) Int. Cl.$^7$ ........................................................... G11B 7/00
(52) U.S. Cl. ................................................. 369/125; 126/32
(58) Field of Search ........................... 369/125, 126, 369/13, 32; 365/118, 113, 147, 237; 396/429; 436/60; 347/121; 442/321

(56) References Cited

U.S. PATENT DOCUMENTS

| | | |
|---|---|---|
| Re. 26,901 | 5/1970 | Dove ............................ 340/173 |
| 2,976,354 | 3/1961 | Banning, Jr. et al. ............ 178/6.6 |
| 2,990,493 | 6/1961 | Seehof et al. .................... 313/74 |
| 3,179,924 | 4/1965 | Auyang et al. .................. 340/173 |
| 3,198,880 | 8/1965 | Toulon ........................... 178/6.7 |
| 3,299,434 | 1/1967 | McNaney ........................ 346/110 |
| 3,330,182 | 7/1967 | Gerber et al. ..................... 88/24 |
| 3,466,389 | 9/1969 | Neiswander et al. ............. 178/6.7 |
| 3,501,586 | 3/1970 | Russell .......................... 178/6.7 |
| 3,624,284 | 11/1971 | Russell .......................... 178/6.7 |
| 3,624,623 | 11/1971 | Breton, Jr. et al. .............. 340/174 |
| 3,700,329 * | 10/1972 | Mason ............................. 436/60 |
| 3,723,978 * | 3/1973 | Maffitt .......................... 365/237 |
| 3,765,743 | 10/1973 | Reaves et al. ..................... 350/7 |
| 3,806,643 | 4/1974 | Russell .......................... 178/6.7 |
| 3,846,660 | 11/1974 | Wolfe et al. ..................... 313/421 |
| 3,872,445 | 3/1975 | Pease ........................... 340/172.5 |
| 3,898,629 | 8/1975 | Westerberg ...................... 340/173 |
| 3,961,315 | 6/1976 | Yokoyama ....................... 340/173 |
| 4,010,318 | 3/1977 | Riddle ........................... 358/178 |
| 4,059,443 * | 11/1977 | Okumura ......................... 365/147 |
| 4,068,218 * | 1/1978 | Likuski .......................... 365/237 |
| 4,300,147 * | 11/1981 | Tarnowski ....................... 347/121 |
| 4,371,894 | 2/1983 | Camras .......................... 358/342 |
| 4,398,223 * | 8/1983 | Lemeison ......................... 369/32 |

(List continued on next page.)

FOREIGN PATENT DOCUMENTS

| | | |
|---|---|---|
| 1 183 948 | 12/1964 | (DE) . |
| 930142 | 7/1963 | (GB) . |
| 1166982 | 10/1969 | (GB) . |

OTHER PUBLICATIONS

*Optical Read–Only Memory System*, IBM Technical Disclosure Bulletin, vol. 13, No. 9 (Feb., 1971).
S. Maslowski, *High Density Data Storage On Ultraviolet Sensitive Tape*, Applied Optics, vol. 13, No. 4 (Apr. 1974).
*Safely Spotting IC Defects*, Electronics Now (Oct., 1995).
European Pat. Office, *PCT International Search Report*, dated Dec. 28, 1998, in connection with PCT Pat. Application Ser. No. PCT/US98/20436.

(List continued on next page.)

*Primary Examiner*—Hoa T. Nguyen
*Assistant Examiner*—Kim-Kwok Chu
(74) *Attorney, Agent, or Firm*—Marshall, O'Toole, Gerstein, Murray & Borun (57) ABSTRACT

A recording device is disclosed. The recording device generates an electron beam which selectively exposes portions of an electron-sensitive and/or UV light-sensitive film to thereby record digital data on the film. A retrieval device is also disclosed. The retrieval device selectively directs a generated electron beam towards a predefined point on a target. The target is simultaneously exposed to a light pattern formed by shining UV light through exposed portions of an electron-sensitive and/or UV light-sensitive film to thereby develop an output signal representative of digital data stored on the film at a location corresponding to the predefined point on the target.

52 Claims, 6 Drawing Sheets

U.S. PATENT DOCUMENTS

| | | | |
|---|---|---|---|
| 4,603,414 | | 7/1986 | Ackerman et al. ............... 369/118 |
| 4,764,818 | | 8/1988 | Crew ................................ 358/347 |
| 4,785,437 | * | 11/1988 | Dransfeld ......................... 369/126 |
| 4,800,526 | | 1/1989 | Lewis ............................... 365/118 |
| 4,817,053 | * | 3/1989 | Ikeda et al. ...................... 365/113 |
| 4,897,731 | * | 1/1990 | Kuehnle ............................ 442/321 |
| 4,943,861 | | 7/1990 | Lambert ........................... 358/244 |
| 4,947,186 | * | 8/1990 | Calloway et al. ................ 347/232 |
| 4,982,362 | * | 1/1991 | Comberg et al. ................ 365/118 |
| 5,208,706 | | 5/1993 | Lemelson ............................. 360/2 |
| 5,313,281 | | 5/1994 | Richards .......................... 348/443 |
| 5,389,985 | * | 2/1995 | Olson et al. ..................... 396/429 |

OTHER PUBLICATIONS

Amended. Publication: "Television/ How Television Works". The World Book Encyclopedia, vol. 19, Copyright 1982, pp. 95–97.

Publication: "Scanning Electron Microscope", p. 79.

Publication: "Scanning Tunneling Microscope", p. 81.

Publication: "The Light Microscope, The Transmission Microscope, and The Scanning Electron Microscope".

Publication: "Measurement And Observation", p. 748.

Amended. Publication: "Electron Microsope", McGraw–Hill Encyclopedia of Science and Technology, vol. 6, 7th Edition, Copyright 1992, p. 192.

Publication: "*Cable Television*". John E. Cunningham. Copyright 1976 and 1980, p. 184.

* cited by examiner

NON-MECHANICAL RECORDING AND RETRIEVAL APPARATUS

RELATED APPLICATIONS

This application claims priority from U.S. patent application Ser. No. 60/060,563, filed Sep. 30, 1997.

FIELD OF THE INVENTION

The present invention relates generally to recording and retrieval devices and, more particularly, to a device for recording data on an electron-sensitive and/or UV light-sensitive (e.g., x-ray mammography) film and a device for retrieving the recorded data from the film.

BACKGROUND OF THE INVENTION

The storage and retrieval of digital data plays a significant role in many areas of modem technology. For example, computers, compact disk players, digital video disk players, digitized medical x-rays, and other devices all utilize digital data. As such, each of these devices requires a medium for storing digital data and, one or more mechanisms for storing and/or retrieving such data to and from the storage medium.

Due to the critical role digital data plays in the operation of many devices, it is essential to store such data in a manner that ensures reliable retrieval. In many instances, it is also important to substantially optimize the speed at which such data can be retrieved.

Heretofore mechanical devices have played a significant role in retrieval and recording devices. By way of example, floppy disk drives, hard disk drives, compact disk drives and digital video disk players, all require sophisticated mechanical structures which rotate the storage medium during retrieval of digital data. However, such mechanical devices are susceptible to premature failure. Indeed, in the typical case, the mechanical components of conventional storage and retrieval devices fail long before the useful lives of the electronics and electrical components associated with those devices have expired. Thus, there is a need for improved apparatus for reliably storing and retrieving digital data from a storage medium.

There are many well known storage media for storing digital data. Exemplary media include floppy disks, hard disks, compact disks, and digital video disks. Such media can be read-only, such as is typically the case with compact disks and digital video disks, or read-write, such as is typically the case with floppy disks and hard disks.

Traditional storage media have suffered from certain drawbacks. For example, some traditional storage media are expensive to manufacture. In addition, some traditional storage media are limited in the amount of data they can store per unit of space they consume. For example, a traditional 3½ inch floppy disk can only store 1.44 megabytes of digital data. Thus, there is a need for an improved storage medium that is relatively inexpensive to produce and copy, and which has improved data storage density capabilities and a longer reliable lifespan. Some of these storage media use magnetic technology which has a very short reliable lifespan. The cd storage media may have a longer lifespan than the magnetic storage media, but its reliable lifespan is also considerably shorter than the recently developed electron-sensitive and/or UV light-sensitive film.

SUMMARY OF THE INVENTION

In accordance with an aspect of the invention, an apparatus for recording digital data on a film is provided. The apparatus includes a vacuum tube having first and second ends; an electron gun disposed at the first end of the vacuum tube for discharging a beam of electrons into the tube; and at least one set of focusing lenses associated with the vacuum tube for focusing the electron beam discharged by the electron gun. It also includes a support for securing a sheet of film at the second end of the vacuum tube; a beam deflection system for directing the electron beam to follow a controlled path; and, means for controlling the electron gun to adjust a characteristic of the electron beam to selectively expose portions of the film to thereby record digital data on the film without moving the film.

In some embodiments, the apparatus is further provided with a faceplate disposed at the second end of the vacuum tube and an anode disposed adjacent the support externally to the vacuum tube.

In some embodiments, the beam deflection system comprises deflection electrodes and a control circuit. In some such embodiments, the control circuit comprises a synchronization generator.

In some embodiments, the control means comprises a control grid coupled to a grid control circuit which modulate the electron beam between on and off states representative of digital data. In such embodiments, the control means modulates the beam to controllably switch between a natural threshold of radiation associated with a faceplate disposed at the second end of the vacuum tube.

In some embodiments, the control means exposes the portions of the film to create a pattern of at least partially transparent spots corresponding to digital data.

In some embodiments, the control means periodically records variable coordinate values with the digital data to facilitate playback. In some such embodiments, the variable coordinate values are referenced to a predefined location on the film. Preferably, a reference target is recorded at the predefined location on the film.

In any of the foregoing embodiments, the film can be either electron sensitive or UV light sensitive. In embodiments, employing UV sensitive film, the apparatus further includes a phosphor coated faceplate disposed adjacent the second end of the vacuum tube, and the beam deflection system directs the electron beam across a surface of the faceplate and the control means adjusts the beam characteristic to selectively illuminate positions on the faceplate. The illuminated positions expose corresponding locations of the film.

In accordance with another aspect of the invention, an apparatus for use with a light source is provided. The apparatus is adapted for retrieving digital data stored on a film. It includes a vacuum tube having first and second ends; an electron gun disposed at the first end of the vacuum tube for discharging a beam of electrons into the tube; and at least one set of focusing lenses associated with the vacuum tube for focusing the electron beam discharged by the electron gun. The apparatus also includes a support for securing a sheet of film at the second end of the vacuum tube such that light from the light source passes through exposed portions of the film; a target for generating electrical signals when simultaneously exposed to light and electrons; and a beam deflection system for directing the electron beam towards at least one predefined location on the faceplate to retrieve data stored on the film without moving the film.

Preferably, the apparatus further includes an output associated with the target for coupling the electrical signals generated by the target to an external device. The electrical signals are representative of digital data stored on the film.

Preferably, the apparatus is also provided with a faceplate disposed at the second end of the vacuum tube, and the target is preferably implemented as an electrode disposed on the faceplate. In such embodiments, the target generates electrical signals when the electron beam traverses a spot on the target illuminated by the light passing through an exposed portion of the film.

In some embodiments, the apparatus is further provided with an optical lens for focusing the light passing through the exposed portions of the film on the target. In some such embodiments, the lens is integrally focused with a faceplate disposed at the second end of the vacuum tube.

Preferably, the apparatus is further provided with an output circuit coupled to the target. The output circuit includes a power supply and a biasing resistor.

In some embodiments, the beam deflection system comprises a drive circuit and a set of electrostatic grids. In such embodiments, the drive circuit may optionally comprise a microprocessor, and/or the drive circuit may optionally drive the electrostatic grids to cause the electron beam to traverse predefined locations of the faceplate. In some such embodiments, the predetermined locations are identified by referencing a target location recorded on the film.

In some embodiments, the apparatus is provided with a map stored on the film and identifying starting points of predetermined blocks of data on the film to facilitate location of the predetermined blocks.

In some embodiments, the drive circuit drives the electrostatic grids to playback a continuous stream of data stored on the film.

In some embodiments, the drive circuit comprises a generator to control a retrieval rate to ensure an appropriate playback speed.

In some embodiments, the apparatus includes a light source disposed adjacent the second end of the vacuum tube. Preferably, the light source comprises an ultraviolet light.

In any of the foregoing embodiments, the film may comprise a write once, read many film, and/or a write many, read many film.

DESCRIPTION OF THE PREFERRED EMBODIMENTS

Figure 1:
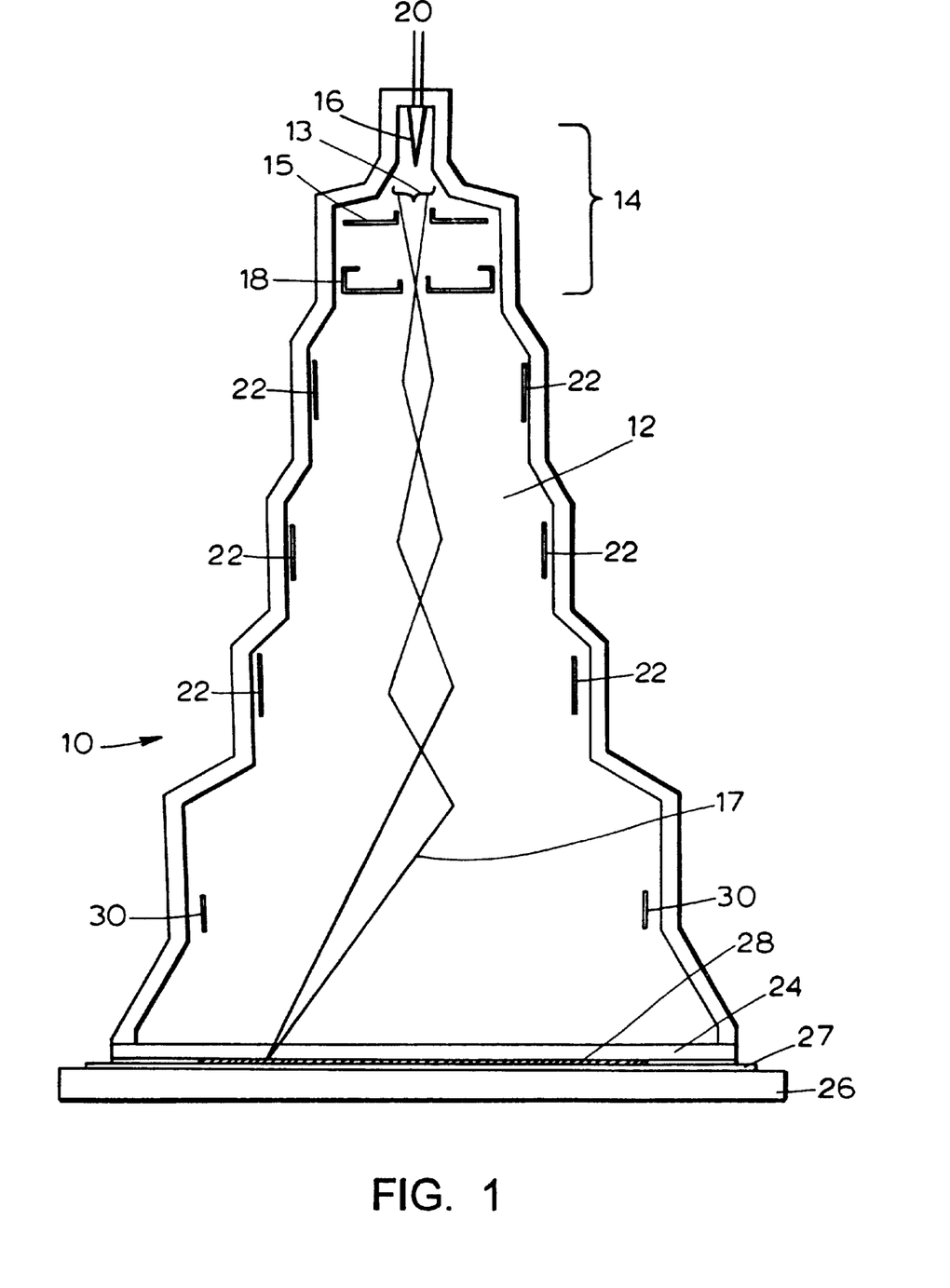
FIG. 1 is a schematic illustration of a recording device constructed in accordance with the teachings of the instant invention, utilizing an external anode.
Figure 2:
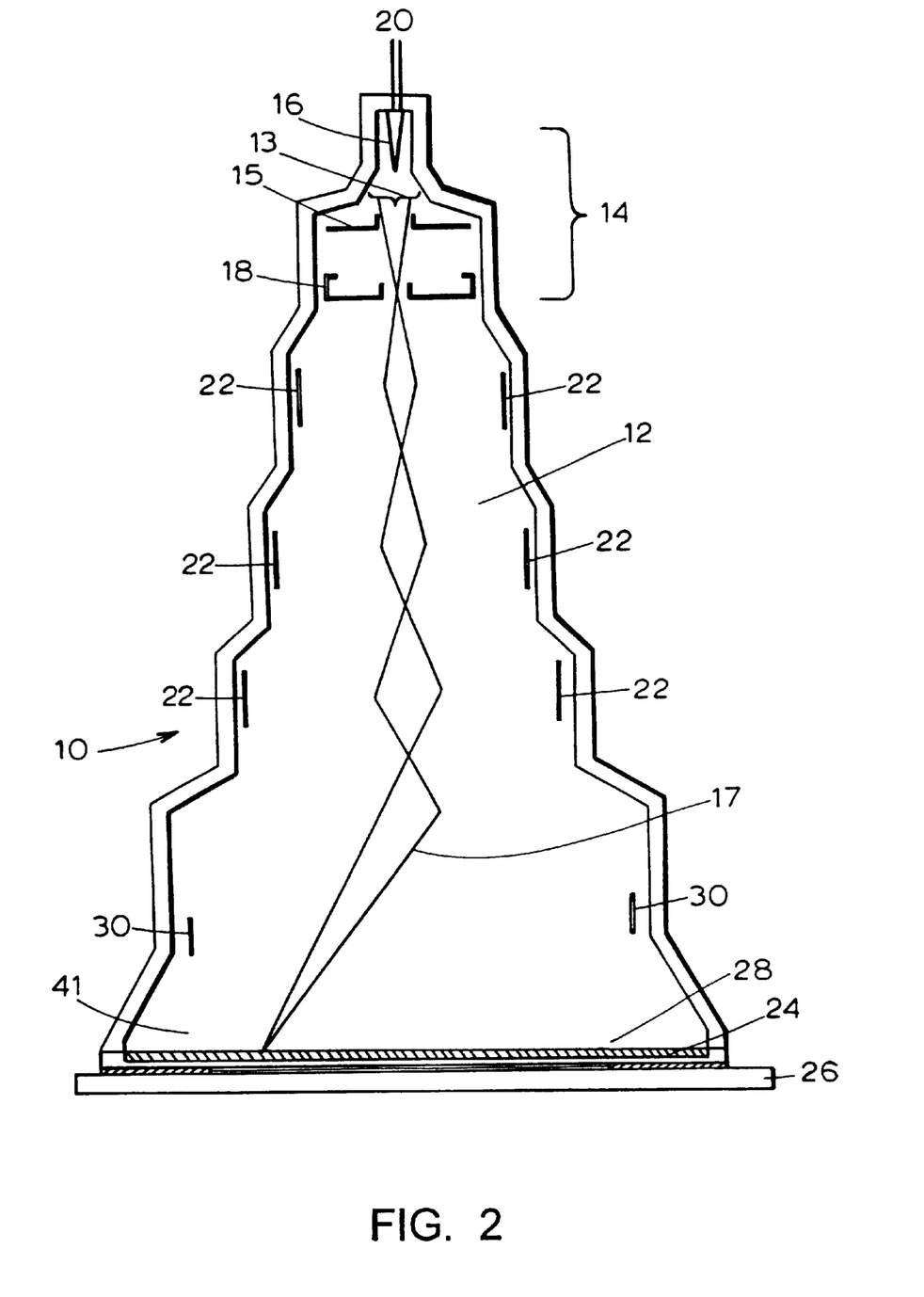
FIG. 2 is a schematic illustration of another recording device constructed in accordance with the teachings of the instant invention, utilizing a phosphor-coated faceplate.

Recording apparatus 10, 40 constructed in accordance with the teachings of the instant invention are illustrated in FIGS. 1 and 2. As explained in detail below, the recording apparatus 10, 40 are advantageously adapted to record data upon a suitably positioned film such as electron-sensitive and/or UV light-sensitive film without the assistance of mechanical devices. In other words, the apparatus provide reliable and accurate means for recording digital data which do not suffer from the susceptibility to mechanical failure typical of traditional recording apparatus.

As mentioned above, the recording apparatus 10, 40 are preferably employed to record data on an electron-sensitive and/or UV light-sensitive film. Although the commercially available film sold by Sterling Diagnostic Imaging Corp. under the tradename MicroVision-C is presently preferred in this role, persons of ordinary skill in the art will readily appreciate that other films could likewise be employed without departing from the scope of the invention. There are films that are superior than the above-mentioned film. However, such films are proprietary to the U.S. Government at the present time. As film technology improves with respect to resolution and speed, the density of data stored on the film can be increased. Density is based on the resolution of the film. High-resolution film requires longer exposure to the electron beam; whereas low-resolution film requires less exposure time of the electron beam. Therefore, low-resolution film can be scanned at a faster scanning rate. An inherent property of electron-sensitive and/or UV light-sensitive film is: as the resolution (density) increases, the speed decreases. Therefore, to record very large quantities of data on the film, the recording cannot be done in real time. This is not a critical factor for most data such as videos and music. However, when it is critical to record in real time, the quantity of data that can be recorded, decreases. Some of the speed limitations can be compensated for by increasing the film processing time. There are other films that are used for laser imaging that do not use liquid processing (e.g., carbon granules) and, therefore, do not require any processing time. This type of film can also be used without departing from the scope or spirit of the invention. In any event, the film is preferably selected such that exposure to electrons and/or UV light (and further chemical processing) causes a darkening or lightening of the exposed sections.

For the purpose of providing a suitable environment for developing and controlling an electron beam, the recording apparatus 10, 40 are each provided with a vacuum tube 12 of conventional design. The vacuum tube 12 preferably comprises a cathode-ray tube, similar to the low energy charged-induced voltage alterations (LEVICA) scanning electron microscope developed by Sandia National Laboratory. As shown in FIGS. 1 and 2, the vacuum tubes 12 include a sealed volume which has had substantially all air removed therefrom by a pump or the like. Such vacuum tubes are commonly used in television and scanning x-ray microscopes and will not be further discussed here.

To generate an electron beam, the recording apparatus 10, 40 are each further provided with an electron gun 14 comprising a filament 16, a cathode 13, an anode 18, and a control grid 15. The filament 16 of each gun 14 is coupled to a source of highly regulated and controlled voltage via a lead 20. The voltage should be sufficient to generate enough heat to excite the cathode 13 to cause a high electron flow. As shown in FIGS. 1 and 2, when suitably energized, the electron guns 14 will each develop and discharge a beam 17 of electrons into their respective vacuum tube 12.

The discharged electrons are focused into a very fine beam 17 by electrostatic beam focusing and condensing lenses 22. In the preferred embodiment three such lenses 22 are provided for each tube 12, but other numbers of lenses could also be employed. Regardless of the number of lenses selected, the lenses 22 preferably generate one or more electrostatic fields which deflect and focus the electron beam 17. As will be appreciated by those of ordinary skill in the art, the lenses 22 can be implemented as either capacitive or inductive devices without departing from the scope of the invention. Electrostatic focusing is preferred because it achieves: 1) minimum geometric distortion (because of a more uniform field); 2) low shading; 3) uniform resolution over the scanned area; 4) shorter flyback (because no resonant energy is stored in the deflection coil); 5) high registration stability (because of no heating of deflection electrodes compared to the heating of deflection coils); and 6) no eddy-currant losses and resultant line-start nonlinearity.

As shown in FIG. 1, the end of the vacuum tube 12 opposite the electron gun 14 is sealed by a high quality, substantially flat faceplate 24. In the embodiment shown in FIG. 1, a film support 26 comprising an external anode 27 is disposed adjacent this faceplate 24 such that a sheet of film 28 supported thereon can be positioned adjacent, and preferably in contact with, the faceplate 24. The close proximity between the film 28 and the faceplate 24 maximizes the effectiveness of the electron beam's radiation.

The apparatus 40 shown in FIG. 2 is substantially the same as the apparatus 10 shown in FIG. 1, except that the faceplate 24 of the apparatus 40 has an ultra-fine phosphorus coating 41 and the film support 26 of the apparatus 40 does not have an external anode 27. In recording apparatus 10, it is necessary to place an anode outside the vacuum tube 12 to increase the intensity and the quantity of the electrons. As a safety precaution, but not necessary for the scope of this invention, the external anode 27 may be at the same potential as the earth, and all other voltages negative according to their normal function. Because of the ultra-fine phosphorus coating, the apparatus 40 does not require the external anode 27.

In the apparatus 40, the striking of the electron beam 17 against the phosphorus coating causes the phosphor to glow, thereby emitting photons (light) which expose the film. Because blue (UV) phosphorus has a high photon output, it is preferred for use in the coating.

For the purpose of directing the electron beam 17 along a predefined path, the vacuum tube 12 is further provided with an electrostatic beam deflection system comprising electrostatic electrodes 30 coupled to a control circuit 34. Control circuit 34 preferably energizes the electrostatic electrodes 30 to thereby direct the beam 17 along a continuous path across the surface of the faceplate 24. In the preferred embodiment, four electrostatic electrodes 30 are provided (one on each side of the vacuum tube 12), and the control circuit 34 is implemented by a suitably programmed synchronization generator. However, persons of ordinary skill in the art will readily appreciate that other numbers of electrostatic electrodes and/or other implementations of the control circuit 34 could also be employed without departing from the scope of the invention. The focusing and intensity of the electron beam must be adjusted for the distance the beam travels from side to side and top to bottom as it scans the film 28 in apparatus 10, and/or the phosphorus coating 41 in apparatus 40. The adjusting is done through programming of the software in the control circuit 34.

In order to encode the electron beam with data to be recorded on the film 28, the recording apparatus is provided with a grid control circuit 32. The control grid 15 is preferably used to modulate the electron beam 17 between "on" and "off" states representative of digital data to be recorded. Preferably, the electron beam 17 will not be completely turned off during recording. On the contrary, the beam is preferably generated on a continuous basis but modulated by the control grid 15 to selectively and controllably switch between slightly above and slightly below the natural threshold of radiation for the film/faceplate combination (e.g., the level of voltage for which any less will not expose the film 28). In other words, the control grid 15 is adapted to modulate the beam 17 in accordance with a stream of data bits to be recorded, such that beam 17 exposes a corresponding pattern of points on the film 28 as the scanning electrostatic electrodes 30 direct the beam along its continuous path. Preferably, the film 28 is selected such that the pattern of exposed sections created by the modulated beam 17 comprises a pattern of at least semi-transparent spots. The semi-transparent spots can transmit UV light having a wavelength falling within a range of predefined wavelengths. The non-exposed sections of the film will preferably prevent light (photons) from passing.

The recording devices 10, 40 are particularly well suited for recording digital data. As those skilled in the art will readily appreciate, the recording devices 10, 40 can be programmed to record digital "1"s as a dark spot (i.e., an unexposed section of film) and "0"s as an at least semi-transparent spot, or vice versa, without departing from the scope of the invention. As those skilled in the art will further appreciate, the number of bytes that can be recorded on a given sheet of film by the recording apparatus is dependent upon the size of the electron beam, the size of the film, the resolution of the film, and the speed of the film. It is, therefore, preferable to match the size of the beam 17 to the resolution of the film 28 to maximize the amount of data a sheet of film of a given size can record. When the above-noted presently preferred film is employed, it is preferred that the electron beam be focused to one micron or less at its tip such that the exposed sections of the film have a radius of approximately one-half micron. When the preferred criteria are followed, it is estimated that a microfiche-sized piece of film will hold approximately fifty gigabytes of data.

Figure 4:
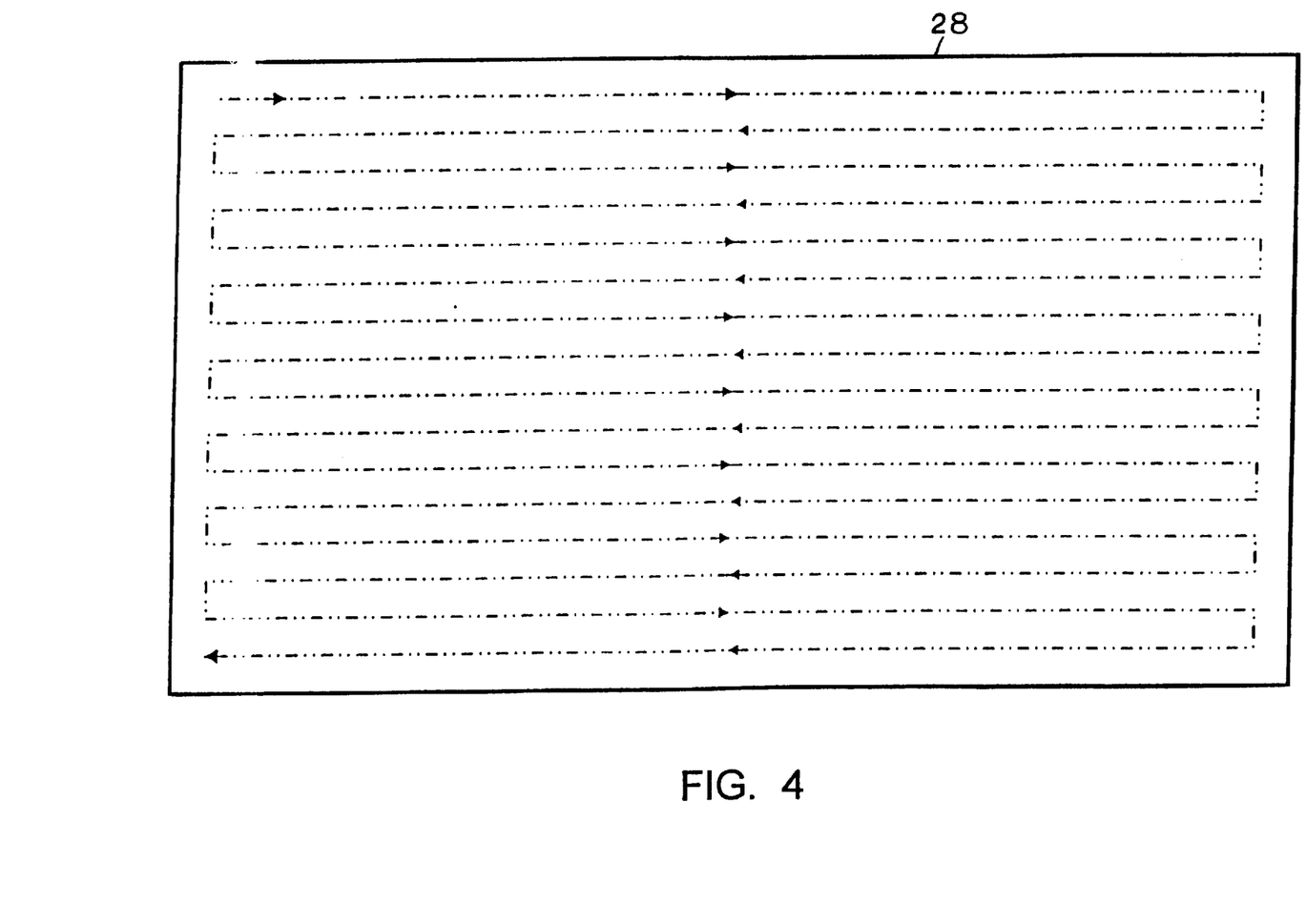
FIG. 4 is a schematic illustration of an exemplary scanning technique.

As mentioned above, the electron beam is preferably not turned off during recording thereby avoiding "splattering" of the beam and, thus, unwanted exposure of the film 28 which might otherwise be caused by turning the beam on and off. As also mentioned above, the movement of the beam 17 is preferably continuous across the film 28, thereby preventing exposure of the same spot twice. A preferred path for movement of the beam 17 across a rectangular film sheet 28 is shown in FIG. 4. Preferably, the path is completely continuous with no breaks. The dashes and dots in FIG. 4 are representative of "Ons (1's)" and "Offs (0's)". Preferably, the physical width between horizontal paths is the same as the space between successive bits ("Ons" and "Offs"). Those skilled in the art will, however, appreciate that other paths, including, without limitation, discontinuous and/or circular paths, could also be employed without departing from the scope of the invention.

In order to facilitate subsequent playback or retrieval of the recorded data, the recording device is preferably programmed to imprint a target, symbol or pattern at a predefined location on the film. The target, symbol or pattern is then understood to represent a predefined reference location on the film (such as 0, 0 in an x, y rectangular coordinate system), which can be subsequently used to randomly locate and retrieve data stored at any desired point on the film as explained below. Preferably, the reference target is located in a corner of the film sheet at a starting point for recording data.

To further facilitate retrieval of recorded data, the control grids 15 of the recording devices 10, 40 are preferably programmed to modulate the beam 17 to record a coordinate value defined relative to the reference target for every predefined unit of data recorded on the film. For example, to record the digital byte "00000000" when the next section of film available for recording is at (1,0) in an x, y coordinate system, the apparatus 10, 40 would record two coordinate values such as "001" and "000" followed by the byte "00000000". While the predefined unit can comprise any convenient size or group of data bits, in the preferred embodiment the predefined unit comprises eight bits or a byte of data. Similarly, while any desired coordinate system could be employed, in the presently preferred embodiment, an x, y coordinate system keyed to the above-noted reference point is utilized.

In order to provide a convenient means for loading film into the recording apparatus 10, 40, a conventional mechanical transport mechanism (not shown) can be provided for each apparatus 10, 40. As will be appreciated by those skilled in the art, the transport mechanism can be implemented in any number of ways without departing from the scope of the invention. By way of example, not limitation, it can be implemented as a sliding drawer in a manner analogous to a conventional loading tray in a single disk compact disk player. The mechanism can be motor driven or manually powered. Optionally, film support 26 can form part of the transport mechanism. For instance, the film support 26 may comprise the sliding drawer.

Figure 3:
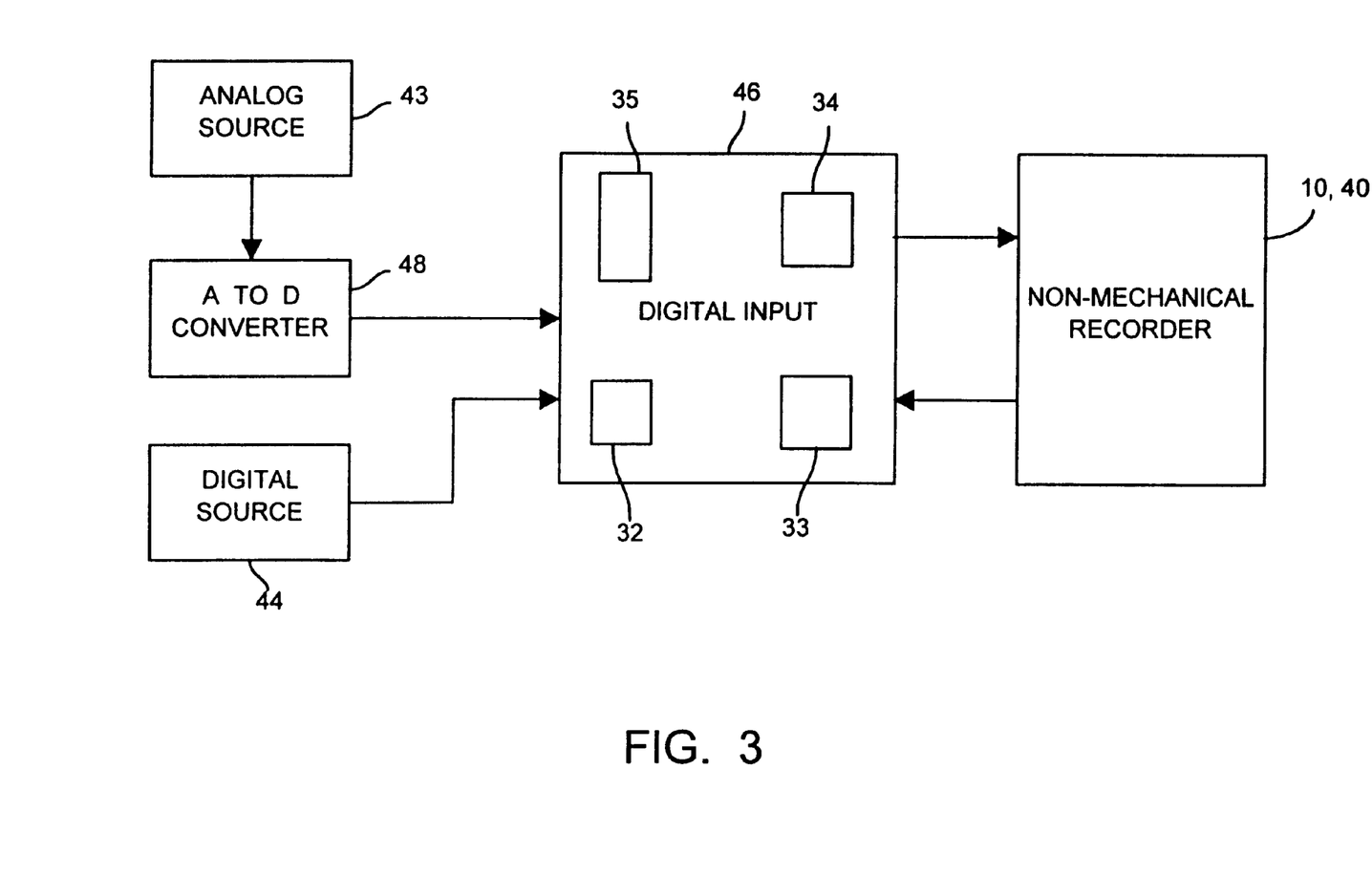
FIG. 3 is a block diagram illustrating exemplary applications for the recording devices of FIGS. 1 and 2.

Exemplary environments of use for the recording apparatus 10, 40 are illustrated generally in FIG. 3. As shown in that figure, the recording apparatus 10, 40 can be used with both analog and digital sources 43 and 44. Exemplary analog sources 43 include, without limitation, analog televisions, video cassette recorders, and/or audio devices. Exemplary digital sources 44 include, without limitation, a cd-rom, a floppy disk drive, a hard disk drive, a computer, a digital video disk player and/or a digital television.

In any event, since in the preferred embodiment, the recording apparatus 10, 40 are used to record digital data, the grid control circuit 32 is preferably provided with digital data via a digital input circuit 46 which comprises grid and beam control circuitry 32 and 34, conventional digital processing circuitry 33, and conventional encoding and error correction circuitry 35. As shown in FIG. 3, digital sources 44 can be directly connected to the digital input circuit 46. A conventional analog to digital converter 48 is employed to digitize the output of the analog source 43 for the digital input circuit 46. Digital input circuit 46 preferably conditions received input signals for use by the grid control circuit 32. For example, the input circuit 46 can filter and step received signals to appropriate voltage levels for use in apparatus 10, 40.

As will be appreciated by those skilled in the art, the physical size of the film and of the recording apparatus 10, 40 are determined by the intended application. For example, they can be miniaturized or constructed at a microfiche size. Similarly, the film can have a sheet format or be constructed as a coiled strip. Both the size and format are selected to accommodate the desired quantity and access rate of the data to be stored and retrieved. In one presently contemplated embodiment, a 5 inch by 5 inch square film sheet is employed.

Figure 5:
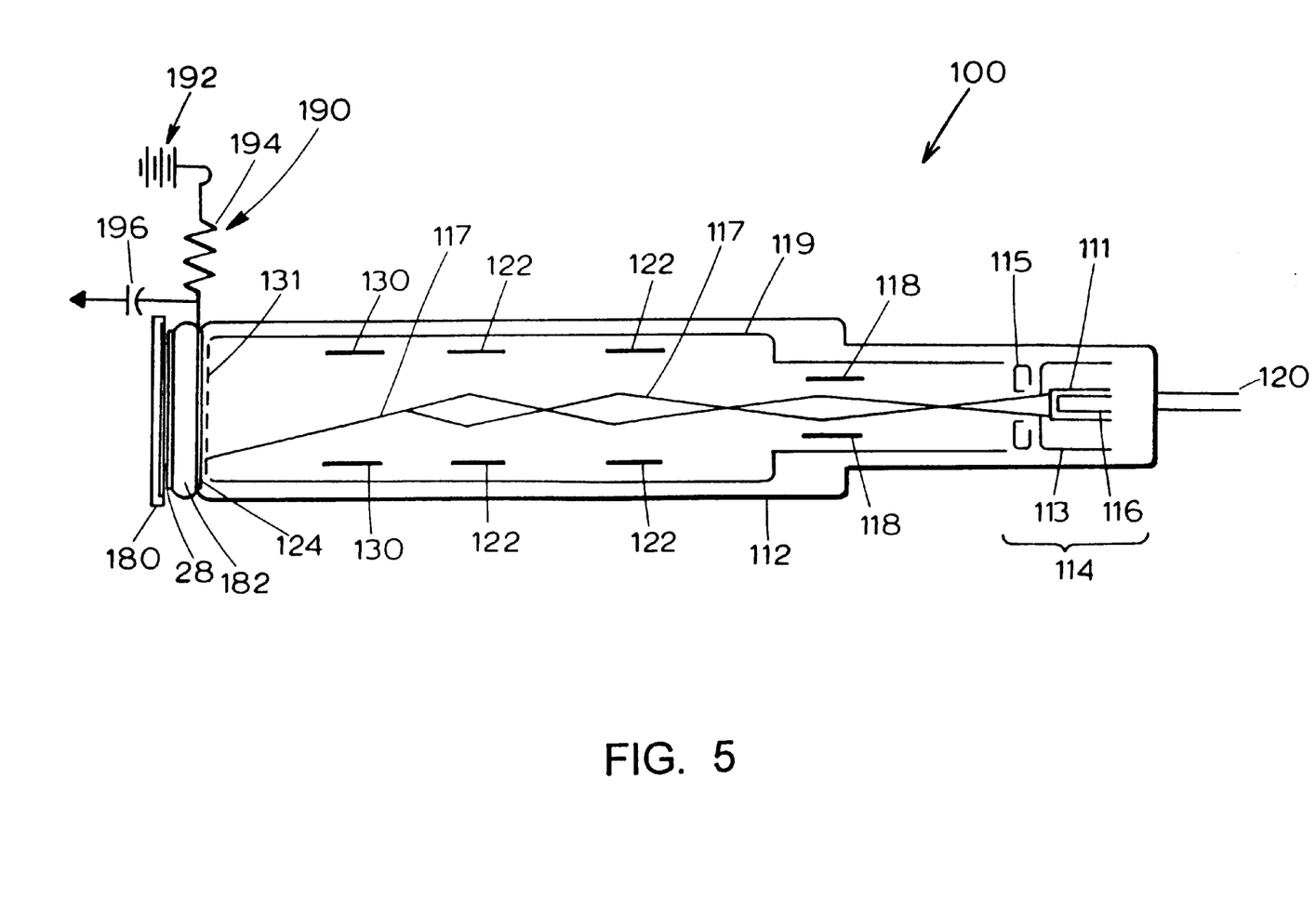
FIG. 5 is a schematic illustration of a retrieval device constructed in accordance with the teachings of the instant invention.

A retrieval apparatus 100 constructed in accordance with the teachings of the invention is illustrated in FIG. 5. As explained in detail below, the retrieval apparatus 100 is adapted to retrieve and output data stored on a film, such as the film 28 processed by the recording apparatus 10, 40. As with the recording devices 10, 40, other than an optional film transport device, the retrieval apparatus 100 operates without the use of mechanical devices and, thus, does not suffer from the susceptibility to mechanical failure characteristic of prior art retrieval systems which rely on moving mechanical structures for operation.

The core of the retrieval apparatus 100 is fashioned after a vidicon diode gun camera tube, with positive grid 115 added before the final beam-defining aperture. As with the recording apparatus 10, 40, the retrieval apparatus 100 is provided with a vacuum tube 112. Also like the recording apparatus 10, 40, the vacuum tube 112 of the retrieval apparatus 100 includes an electron gun 114 including a filament 116, a cathode 111, a control grid 113, a beam-forming grid 119, an anode 118, a lead 120 coupled to a voltage supply, focusing lenses 122, scanning grids 130, and a glass faceplate 124. Unlike a vidicon camera tube, this tube utilizes grid control circuitry to develop a highly defined and intense electron stream. Preferably, the focusing electrostatic grids 122 focus the electron beam 117 to a tip of one micron; or a dimension which is selected to match the resolution of the film 28.

In order to generate electrical signals representative of the data stored on the film 28, the retrieval apparatus 100 is provided with a target 131. Target 131 is a conventional structure included in commercially available vidicon diode gun camera tubes. In particular, it comprises an electrode deposited on the surface of glass plate 124. The electrode is coated with a very thin layer of micro-fine UV photo-conductive material. As is conventional, target 131 is adapted to become conductive only when a spot on the electrode is contacted by an electron beam 117 of suitable intensity, and the UV photo-conductive material associated with that same spot is sufficiently excited by UV light. As explained below, that UV light is provided by shining UV light through an exposed film 28 such that a pattern of UV light corresponding to the data recorded on the film 28 shines on the target 131. Then, as the electron beam 117 traces a path across the target 131, the target 131 outputs a series of electrical signals corresponding to the data stored on the film 28. Very high frequency UV light is used because of its very short wavelength and high photon stream.

In order to locate a light pattern corresponding to the pattern recorded on film 28 on the target 131, a UV light source 180 and an optical lens 182 are provided. As shown in FIG. 5, the UV light source 180 is positioned beneath film 28, and optical lens 182 is located between film 28 and glass plate 124 such that the UV light source 180 and optical lens 182 provide a back lighting system which illuminates the target 131 at only the spots where the film has been exposed. Preferably, the light source 180 is a UV black light with a wavelength of 10 to 50 nm.

Although the face plate 124 and the optical lens 182 could be implemented as separate devices, in the preferred embodiment those structures are integrally formed. When the plate 124 and the lens 182 form an integral structure, the plate 124 and the film should be substantially the same size. The integral plate/lens will preferably transmit parallel light with minimal, if any, light scattering. Despite the foregoing, those skilled in the art will appreciate that the separate lens 182 and faceplate 124 approach would be advantageous in applications where it is desirable to focus UV light from a relatively large film onto a target 131 of smaller size than the film within the refracting properties of an optical lens.

Preferably, the film 28 is supported by a frame or the like which does not interfere with UV light transmission through the operative portions of the film. If desired, a transport mechanism for loading film such as that described in connection with the recording apparatus 10, 40 can be provided.

As shown in FIG. 5, target 131 is coupled to an output circuit 190. The output circuit 190 comprises a power supply 192 coupled to a biasing resistor 194, and a capacitor 196 acting as a low pass filter. As the electron beam 117 traverses the surface of the target 131, a series of electrical pulses corresponding to spots where light passed through the film 28 will be generated and output by circuit 190.

In some embodiments, the electrostatic beam control system 122 is provided with a suitably programmed, microprocessor-based drive circuit. The drive circuit preferably drives the electrostatic grids 130 to locate and retrieve the data stored at predetermined locations identified via the reference target and stored coordinates mentioned above. Such an apparatus shortens retrieval times and renders the retrieval apparatus 100 "random access" in that data at any location on the film 28 can be retrieved independently of the remainder of the data stored on the film 28.

In other embodiments, the drive circuit associated with the electrostatic grids 130 causes the electron beam 117 to continuously trace the path of the stored data from the starting point at the data path towards the end. Such an approach is advantageous in applications such as video or audio playback where continuous playback is the dominant mode of operation. Fast forwarding and/or skipping features can likewise be programmed into the drive circuit such that, upon request from a user, the retrieval apparatus 100 skips ahead through the stored data. If such features are included, the film 28 is preferably provided with a map near the beginning of the data path which identifies the starting points (e.g., the starting coordinates) of certain groups of data. Providing such a map advantageously enables a user to skip ahead to predefined locations in the film. This approach permits a user to skip songs, for example, when the film 28 stores audio recordings.

Regardless of the drive circuit implementation selected, the drive circuit preferably includes an internal generator which controls the playback or retrieval rate to ensure appropriate playback speed. Where playback rate is significant, the appropriate rate is preferably stored on the film 28 and, after retrieval, is used by the internal generator of the drive circuit to playback data at the required rate.

As will be appreciated by those skilled in the art, light source 180 can be implemented in many ways without departing from the scope of the invention. However, it is presently preferred that a substantially even light is employed behind the film 28, and, thus, on target 131. It is also preferred that the light source provide ultraviolet light. A Black Light, UV fluorescent light, satisfies these conditions and, thus, is presently preferred in the role of the light source 180.

Figure 6:
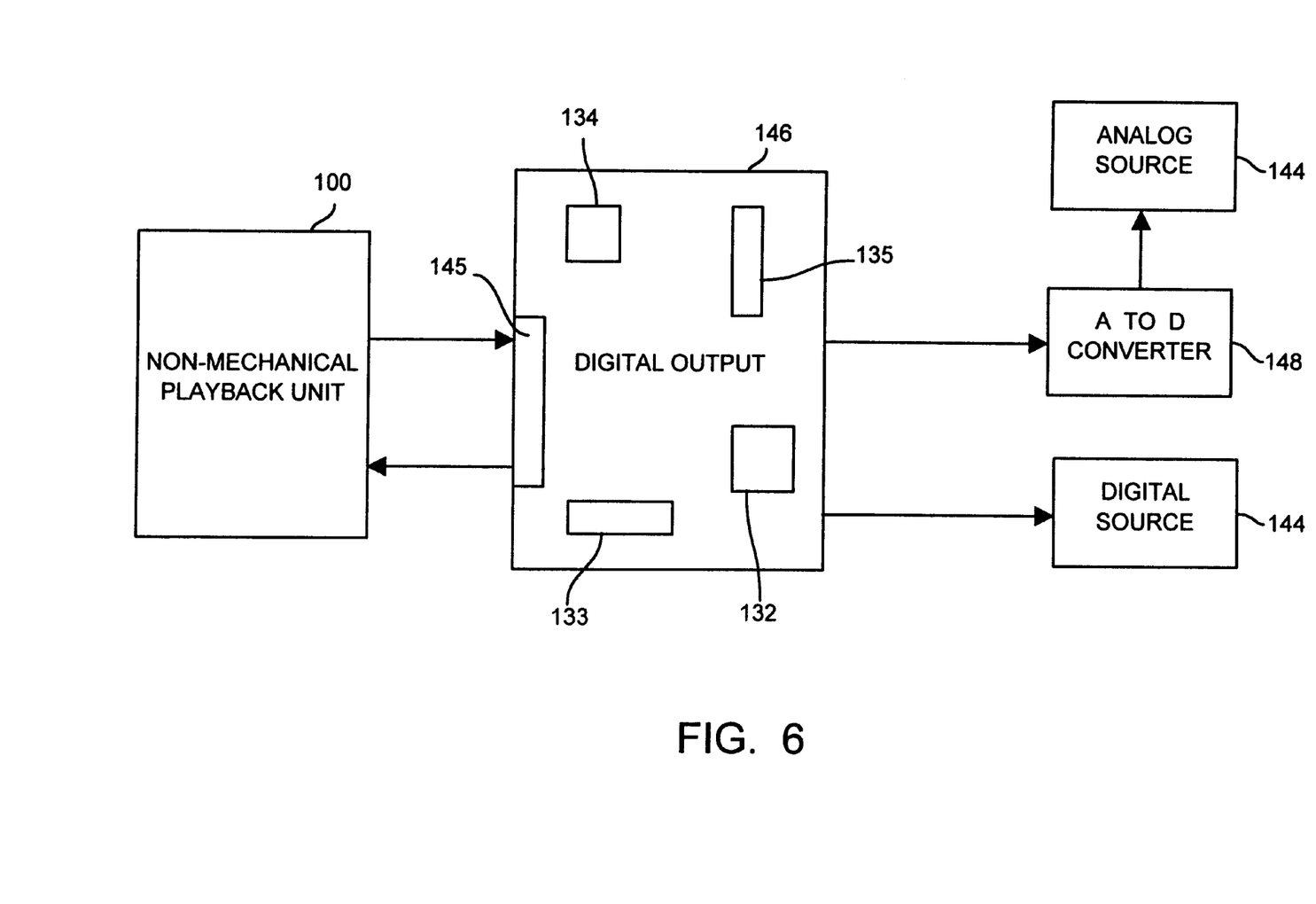
FIG. 6 is a block diagram illustrating exemplary applications for the playback device of FIG. 5.

FIG. 6 illustrates exemplary environments of use for the retrieval apparatus 100. As shown in that figure, the retrieval apparatus 100 is coupled to suitable interface circuitry 145 of a digital output circuit 146. The digital output circuit 146 includes beam control and grid control circuitry 132, conventional error correction circuitry 133, conventional data decoding circuitry 134, and a conventional CPU and system management circuit 135. The digital output circuit 146 can be coupled directly to a digital device 144 such as a computer, or a digital television. Alternatively, the digital output circuit 146 can be coupled through a conventional digital to analog converter 148 to an analog device 142 such as an analog television, or a stereo amplifier.

As mentioned above, the presently preferred embodiments of the recording and retrieval apparatus 10, 40, 100 employ MicroVision-C film, a mammography film with excellent resolution. Since after exposure, this film cannot be erased, it is intended for write once, read many type applications. For example, this film could be used as an alternative to compact disks for storing audio data, or as an alternative to digital video disks, laser disks, or VHS tapes for storing video/audio data such as movies. If, however, it is desired to use the recording and retrieval apparatus 10, 40, 100 in write many, read many applications, an emulsion such as that used in the Magneto Optical Disk by Imation, Inc. of St. Paul, Minn., which retains its sensitivity to an electron beam after multiple exposures wherein, where applicable, successive exposures reverses the effect of predecessor exposures, could be employed. Such an emulsion would be positioned in a magnetic field during the re-write process. The noted emulsion would need to be modified to be electron-sensitive, not thermal-sensitive. Eastman Kodak and Sterling Diagnostic Imaging Corp. both sell such an electron-sensitive and UV light-sensitive emulsion to the public. When such an emulsion is utilized, exemplary applications of the recording and playback apparatus include replacing a floppy disk drive and/or a hard disk drive.

In summary, persons of ordinary skill in the art will appreciate that improved data recording and retrieval apparatus have been disclosed. Among the advantages enjoyed by the improved apparatus are: the ability to store more data per unit of media volume (e.g., greater data density storage) than prior art devices; recording and near instant random access retrieval of data (e.g., near-zero "seek-time"); enhanced durability as mechanical parts which can wear out, become misaligned, or require maintenance, are not used in recording or retrieving data from a suitably positioned film; universality of the data storage film (e.g., the same piece of film can be employed to store and retrieve data by disparate devices such as a computer, an audio system and a video system, and data stored by one such device can be retrieved and used by another); economic manufacturability using existing facilities and existing methods of mass distribution; and ease of mass-duplication (e.g., as with conventional photographic film, the film 28 (exposed or otherwise) could be mass-duplicated for a few cents per copy. The amount of data that can be stored in this system is limited only by the bandwidth of the light source, by the resolution of the target material on the faceplate of the electron retrieval tube, by the resolution and speed of the electron-sensitive film and/or UV light-sensitive film, and by the resolution of the phosphor coating on the faceplate. As these limitations are reduced, the capacity of data for a 35 mm square film could be increased in excess of 5 tera-bytes.

Those skilled in the art will further appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

What is claimed is:

1. An apparatus for recording digital data on a film comprising:

a vacuum tube having first and second ends;

an electron gun disposed at the first end of the vacuum tube for discharging a beam of electrons into the tube;

at least one set of focusing lenses associated with the vacuum tube for focusing the electron beam discharged by the electron gun;

a support for securing a sheet of film at the second end of the vacuum tube and external to the vacuum tube;

a beam deflection system for directing the electron beam to follow a controlled path; and, means for controlling the electron gun to adjust a characteristic of the electron beam to selectively expose portions of the film when the film is secured to the support to thereby record digital data on the film without moving the film.

2. An apparatus as defined in claim 1 further comprising a faceplate disposed at the second end of the vacuum tube and an anode disposed adjacent the support externally to the vacuum tube.

3. An apparatus as defined in claim 1 wherein the beam deflection system comprises deflection electrodes and a control circuit.

4. An apparatus as defined in claim 3 wherein the control circuit comprises a synchronization generator.

5. An apparatus as defined in claim 1 wherein the control means comprises a control grid coupled to a grid control circuit which modulate the electron beam between on and off states representative of digital data.

6. An apparatus as defined in claim 5 wherein the control means modulates the beam to controllably switch between a natural threshold of radiation associated with a faceplate disposed at the second end of the vacuum tube.

7. An apparatus as defined in claim 1 wherein the control means modulates the beam to expose the portions of the film to create a pattern of at least partially transparent spots corresponding to digital data.

8. An apparatus as defined in claim 1 wherein the beam remains in an on state throughout a recording process.

9. An apparatus as defined in claim 1 wherein the controlled path is continuous.

10. An apparatus as defined in claim 1 wherein the control means periodically records variable coordinate values with the digital data to facilitate playback.

11. An apparatus as defined in claim 10 wherein the variable coordinate values are referenced to a predefined location on the film.

12. An apparatus as defined in claim 11 wherein a reference target is recorded at the predefined location on the film.

13. An apparatus as defined in claim 1 further comprising means for loading film into the apparatus.

14. An apparatus as defined in claim 1 wherein the film is electron sensitive.

15. An apparatus as defined in claim 1 wherein the film is UV light sensitive.

16. An apparatus as defined in claim 15 further comprising a phosphor coated faceplate disposed adjacent the second end of the vacuum tube, wherein the beam deflection system directs the electron beam across a surface of the faceplate and the control means adjusts the beam characteristic to selectively illuminate positions on the faceplate, and wherein the illuminated positions expose corresponding locations of the film.

17. An apparatus as defined in claim 1 wherein the at least one set of focusing lenses comprise electrostatic focusing lenses.

18. An apparatus as defined in claim 1 wherein the beam deflection system comprises an electrostatic system.

19. An apparatus as defined in claim 1 wherein the film comprises a write once, read many film.

20. An apparatus as defined in claim 1 wherein the film comprises a write many, read many film.

21. An apparatus as defined in claim 1 wherein the control means comprises a control grid coupled to a grid control circuit which modulates the electron beam between above and below a predetermined threshold of radiation to record the digital data.

22. An apparatus for recording digital data on a film comprising:

a vacuum tube having first and second ends;

an electron gun disposed at the first end of the vacuum tube for discharging a beam of electrons into the tube;

at least one set of focusing lenses associated with the vacuum tube for focusing the electron beam discharged by the electron gun;

a support for securing a sheet of film at the second end of the vacuum tube;

a beam deflection system for directing the electron beam to follow a controlled path; and, means for controlling the electron gun to adjust a characteristic of the electron beam to selectively expose portions of the film when the film is secured to the support to thereby record digital data on the film without moving the film, wherein the control means periodically records variable coordinate values with the digital data to facilitate playback.

23. An apparatus as defined in claim 22 wherein the variable coordinate values are referenced to a predefined location on the film.

24. An apparatus as defined in claim 23 wherein a reference target is recorded at the predefined location on the film.

25. An apparatus for recording digital data on a film comprising:

a vacuum tube having first and second ends;

an electron gun disposed at the first end of the vacuum tube for discharging a beam of electrons into the tube;

at least one set of focusing lenses associated with the vacuum tube for focusing the electron beam discharged by the electron gun;

a support for securing a sheet of UV light sensitive film at the second end of the vacuum tube;

a beam deflection system for directing the electron beam to follow a controlled path;

means for controlling the electron gun to adjust a characteristic of the electron beam to selectively expose portions of the film when the film secured to the support to thereby record digital data on the film without moving the film; and a phosphor coated faceplate disposed adjacent the second end of the vacuum tube, wherein the beam deflection system directs the electron beam across a surface of the faceplate and the control means adjusts the beam characteristic to selectively illuminate positions on the faceplate, and wherein the illuminated positions expose corresponding locations of the film.

26. An apparatus for retrieving digital data stored on a film comprising:

a vacuum tube having first and second ends;

an electron gun disposed at the first end of the vacuum tube for discharging a beam of electrons into the tube;

at least one set of focusing lenses associated with the vacuum tube for focusing the electron beam discharged by the electron gun;

a light source located adjacent the second end external to the vacuum tube;

a support for securing a sheet of film between the second end of the vacuum tube and the light source such that light from the light source passes through exposed portions of the film;

a target for generating electrical signals indicative of stored digital data when simultaneously exposed to (a) the light passing from the light source through the exposed portions of the film when the film is secured to the support and (b) electrons from the electron beam; and a beam deflection system for directing the electron beam towards at least one location on the faceplate to retrieve data stored on the film.

27. An apparatus for recording digital data on a film comprising:

a vacuum tube having first and second ends;

an electron gun disposed at the first end of the vacuum tube for discharging a beam of electrons into the tube;

at least one set of focusing lenses associated with the vacuum tube for focusing the electron beam discharged by the electron gun;

a faceplate disposed at the second end of the vacuum tube;

a support for securing a sheet of film at the second end of the vacuum tube;

an anode disposed adjacent the support externally to the vacuum tube such that the support is located between the second end of the vacuum tube and the anode;

a beam deflection system for directing the electron beam to follow a controlled path; and, means for controlling the electron gun to adjust a characteristic of the electron beam to selectively expose portions of the film when the film secured to the support to thereby record digital data on the film.

28. An apparatus for retrieving digital data stored on a film comprising:

a vacuum tube having first and second ends;

an electron gun disposed at the first end of the vacuum tube for discharging a beam of electrons into the tube;

at least one set of focusing lenses associated with the vacuum tube for focusing the electron beam discharged by the electron gun;

a light source located adjacent the second end external to the vacuum tube;

a support for securing a sheet of film between the second end of the vacuum tube and the light source such that light from the light source passes through exposed portions of the film;

a target for generating electrical signals indicative of at least some of the stored digital data when simultaneously exposed to (a) the light passing from the light source through the exposed portions of the film when the film is secured to the support and (b) electrons from the electron beam; and a beam deflection system for directing the electron beam towards at least one location on the faceplate to retrieve data stored on the film without moving the film.

29. An apparatus as defined in claim 28 further comprising means for loading film into the apparatus.

30. An apparatus as defined in claim 28 wherein the film is electron sensitive.

31. An apparatus as defined in claim 28 wherein the film is UV light sensitive.

32. An apparatus as defined in claim 28 wherein the at least one set of focusing lenses comprise electrostatic focusing lenses.

33. An apparatus as defined in claim 28 wherein the bean deflection system comprises an electrostatic system.

34. An apparatus as defined in claim 28 further comprising a faceplate disposed at the second end of the vacuum tube and wherein the target comprises an electrode disposed on the faceplate.

35. An apparatus as defined in claim 34 wherein the target generates electrical signals when the electron beam traverses a spot on the target illuminated by the light passing through an exposed portion of the film.

36. An apparatus as defined in claim 28 further comprising an optical lens for focusing the light passing through the exposed portions of the film on the target.

37. An apparatus as defined in claim 36 wherein the lens is integrally formed with a faceplate disposed at the second end of the vacuum tube.

38. An apparatus as defined in claim 28 wherein the support comprises a frame.

39. An apparatus as defined in claim 28 further comprising an output circuit coupled to the target, the output circuit including a power supply and a biasing resistor.

40. An apparatus as defined in claim 28 wherein the beam deflection system comprises a drive circuit and a set of electrostatic grids.

41. An apparatus as defined in claim 40 wherein the drive circuit comprises a microprocessor.

42. An apparatus as defined in claim 40 wherein the drive circuit drives the electrostatic grids to cause the electron beam to traverse predetermined locations of the faceplate.

43. An apparatus as defined in claim 42 wherein the predetermined locations are identified by referencing a target location recorded on the film.

44. An apparatus as defined in claim 40 wherein the drive circuit drives the electrostatic grids to playback a continuous stream of data stored on the film.

45. An apparatus as defined in claim 40 wherein the drive circuit comprises a generator to control a retrieval rate to ensure an appropriate playback speed.

46. An apparatus as defined in claim 28 further comprising a map stored on the film and identifying starting points of predetermined blocks of data on the film to facilitate location of the predetermined blocks.

47. An apparatus as defined in claim 28 wherein the light source comprises an ultraviolet light.

48. An apparatus as defined in claim 28 wherein the film comprises a write once, read many film.

49. An apparatus as defined in claim 28 wherein the film comprises a write many, read many film.

50. An apparatus as defined in claim 28 further comprising an output associated with the target for coupling the electrical signals generated by the target to an external device, wherein the electrical signals are representative of digital data stored on the film.

51. An apparatus as defined in claim 28 wherein the beam deflection system comprises deflection electrodes and a control circuit.

52. An apparatus as defined in claim 51 wherein the control circuit comprises a synchronization generator.

* * * * *

UNITED STATES PATENT AND TRADEMARK OFFICE
CERTIFICATE OF CORRECTION

PATENT NO. : 6,288,995 B1
DATED : September 11, 2001
INVENTOR(S) : Bohn

It is certified that error appears in the above-identified patent and that said Letters Patent is hereby corrected as shown below:

Column 12,
Line 43, after "...when the film..." insert -- is --.

Column 13,
Line 30, after "...when the film..." insert -- is --.

Signed and Sealed this

Twelfth Day of March, 2002

Attest:

JAMES E. ROGAN
*Attesting Officer*   *Director of the United States Patent and Trademark Office*